United States Patent [19]
Zydek et al.

[11] Patent Number: 6,012,156
[45] Date of Patent: Jan. 4, 2000

[54] PROCESS AND CIRCUIT ARRANGEMENT FOR MONITORING THE FUNCTION OF A PROGRAM-CONTROLLED CIRCUIT

[75] Inventors: Michael Zydek, Langgons; Wolfgang Fey, Niedernhausen, both of Germany

[73] Assignee: ITT Manufacturing Enterprises Inc., Wilmington, Del.

[21] Appl. No.: 08/860,411

[22] PCT Filed: Dec. 12, 1995

[86] PCT No.: PCT/EP95/04901

§ 371 Date: Aug. 21, 1997

§ 102(e) Date: Aug. 21, 1997

[87] PCT Pub. No.: WO96/20103

PCT Pub. Date: Jul. 4, 1996

[30] Foreign Application Priority Data

Dec. 23, 1994 [DE] Germany .............................. 44 46 314

[51] Int. Cl.⁷ .................................................. G01R 31/28
[52] U.S. Cl. ........................... 714/736; 714/815; 714/819
[58] Field of Search ................................. 371/22.1, 25.1, 371/22.5, 22.6, 67.1; 395/183.13, 183.07; 340/479, 467, 635, 679; 364/141, 143; 714/724, 736, 733, 734, 811, 814, 815, 819, 31, 37

[56] References Cited

U.S. PATENT DOCUMENTS

| 4,535,456 | 8/1985 | Bauer et al. | 395/183.07 |
|---|---|---|---|
| 4,817,418 | 4/1989 | Asami | 395/183.15 |
| 4,835,671 | 5/1989 | Sato et al. | 714/820 |
| 5,265,468 | 11/1993 | Holst et al. | 340/441 |
| 5,550,762 | 8/1996 | Doll | 371/25.1 |
| 5,740,183 | 4/1998 | Lowe | 371/25.1 |

FOREIGN PATENT DOCUMENTS

| 0496509 | 7/1992 | European Pat. Off. . |
|---|---|---|
| 0525574 | 2/1993 | European Pat. Off. . |
| 2606897 | 5/1988 | France . |
| 3008036 | 9/1981 | Germany . |
| 3225455 | 1/1984 | Germany . |
| 3234637 | 3/1984 | Germany . |
| 3502387 | 7/1986 | Germany . |
| 3727551 | 3/1988 | Germany . |
| 3704318 | 8/1988 | Germany . |
| 4101598 | 8/1991 | Germany . |
| 4137124 | 5/1993 | Germany . |
| 2175717 | 12/1986 | United Kingdom . |
| WO 96/20103 | 7/1996 | WIPO . |

OTHER PUBLICATIONS

Search Report of the German Patent Office Relating to Parent German Patent Applicaiton No. 44 46 314.6.

No translation speicherprogrammierbar steuerungen in der Automatisierungstechnik by Dipl.–Phys. Dr. Peter Wratil dated 1989.

No translation Aufbau von uP–Uberwachungs–schaltkreisen by Len Sherman from Elektronik Industrie 8—1994.

No translation Intelligent, wortorientierte Watchdog–Schaltung Sicherheit durch "sich gegenseitig uberwachende" Schaltwege—by Professor Dr.–Ing. W. Kuntz, Dip.–Ing. (FH) D. Ruppert in Electronik 11/May 25, 1990.

English translation of the International Preliminary Examination Report of Application No. PCT/EP95/04901 filed Dec. 12, 1995.

Primary Examiner—Trinh L. Tu
Attorney, Agent, or Firm—Rader, Fishman & Grauer PLLC

[57] ABSTRACT

To monitor the correct function of a microprocessor, microcontroller or any other program-controlled circuit data processing results are checked in the working cycle for correlation with data which are produced independently of the circuit to be monitored and independently of the program run in a monitoring circuit. If deviations indicative of a malfunction occur, a disabling signal is generated. To this effect, data words or a data word sequence is produced in the program run of the circuit to be monitored and transmitted to the monitoring circuit at predetermined times. The content of the data words and the timely appearance of the data words is monitored by way of the monitoring circuit. (FIG. 2)

6 Claims, 2 Drawing Sheets

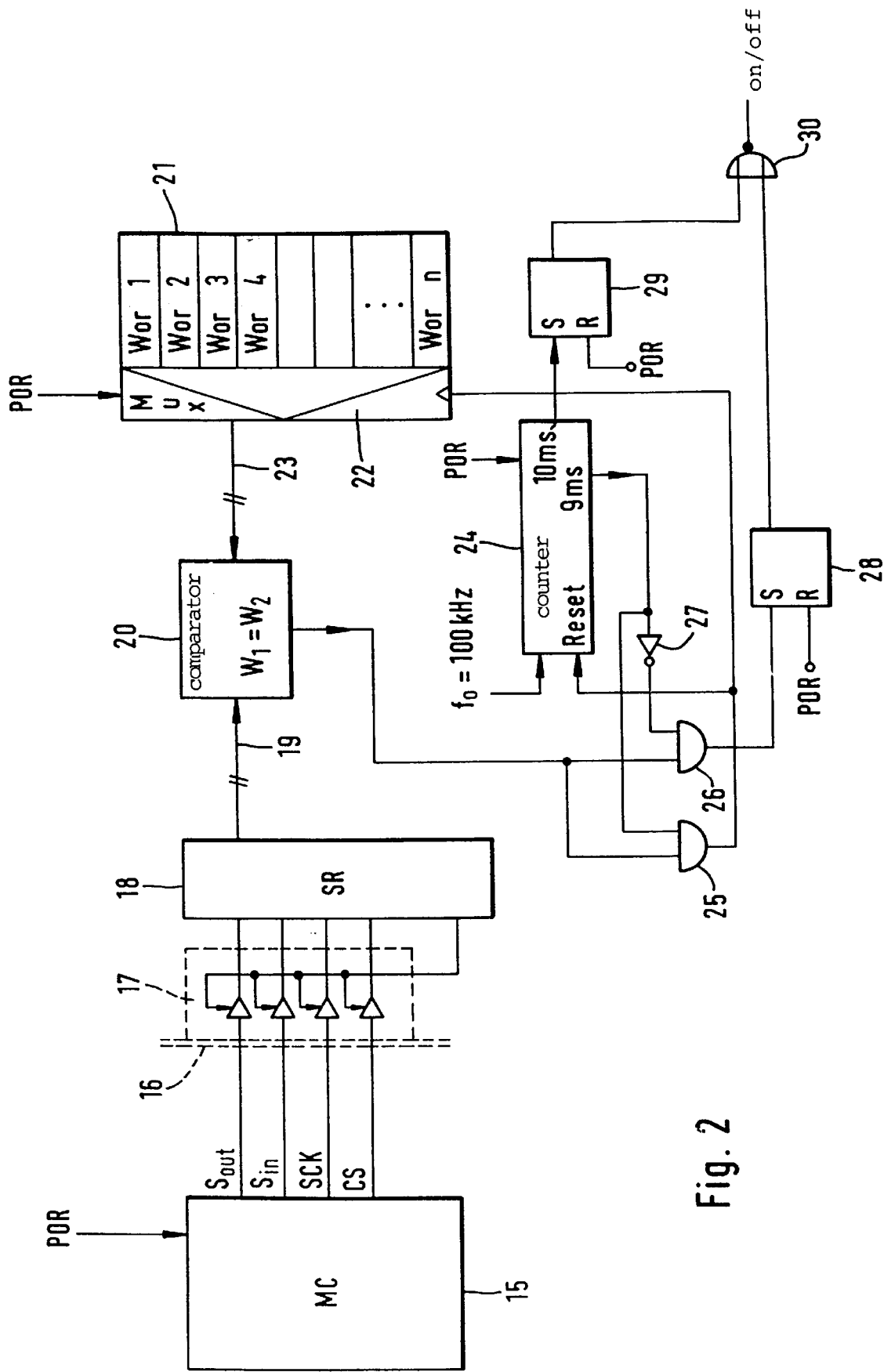

PROCESS AND CIRCUIT ARRANGEMENT FOR MONITORING THE FUNCTION OF A PROGRAM-CONTROLLED CIRCUIT

BACKGROUND OF THE INVENTION

The present invention relates to a process for monitoring the correct function of a program-controlled electronic circuit, such as a microprocessor, microcomputer, microcontroller, or the like, wherein in the working cycle data processing results are checked for partial or complete correlation with data which are produced independently of the circuit to be monitored and independently of the program run in a monitoring circuit, and wherein if deviations indicative of a malfunction occur, an error signal or disabling signal is generated. Circuit arrangements for implementing the process are also comprised in the present invention.

The correct operation of microcomputers and other program-controlled electronic circuits must be monitored especially when the circuits are used for safety-critical control systems. An example of a safety-critical application is the controlling intervention in the brake system of an automotive vehicle, as required, among others, for anti-lock control, traction slip control, driving stability control, etc. When a malfunction of the electronic unit is detected, the electronic control in prior art brake systems is disconnected in order to maintain at least the braking function, even though without anti-lock control. It is also known in the art to deactivate the control only in part, to disconnect it with delay or to switch it over in any other way to a less dangerous condition when defined faults occur.

It is important for such monitoring measures that the malfunction is identified quickly and with a high degree of reliability. To this effect, the input data produced by wheel sensors are processed in the control circuit disclosed in German patent No. 32 34 637 in two parallel, independent, identically designed and identically programmed microcontrollers. The output signals of the two microcontrollers are then checked for correlation. When deviations occur, indicative of a malfunction, the electronic control will be disabled so that the braking function is ensured. Thus, the prior art control circuit is based on a redundant signal processing in two complete, program-controlled circuits. The sole purpose of the redundance is to identify errors with a high degree of reliability in order to disable the control in this case. The disabling mechanisms on their part are also virtually redundant. Thus, considerable effort and equipment is involved for safety reasons.

In another prior art circuit arrangement, as disclosed in German patent application No. 41 37 124, the sensor signals or input signals are processed in two parallel microcontrollers. Only one of the microcontrollers, however, carries out the complete, sophisticated signal processing operation. The second circuit is mainly used for monitoring. Therefore, the input signals, after conditioning and the production of derivatives, are further processed by simplified control algorithms and a simplified control philosophy. Compared to the above mentioned state of the art circuit, the effort and equipment is reduced by the simplified processing in the monitoring microcontroller.

It would principally be possible nowadays to incorporate a plurality of complete circuit systems, for example, two microcomputers, on one single chip, to supply them with identical input data and to compare the data processing results of the different circuit systems for monitoring the correct functioning. However, in such an electronic circuit design, it cannot be ruled out with a sufficiently high degree of reliability that a correct monitoring signal (watchdog signal) will be generated due to a fault in the circuit even if the data processing results of both circuit systems are not in correlation, or a circuit system is defective.

A "one-processor solution", i.e. the limitation to one single programmed circuit with a monitoring circuit of conventional type, does not at all permit a sufficiently reliable identification of malfunctions.

Further, German patent application No. 40 04 782 discloses an ABS system with two microcontrollers which both generate a monitoring signal that represents an alternating signal with a predetermined frequency and a predetermined sequence. A safety circuit compares the alternating signals with a time normal derived from a clock generator which is independent of the working cycle of the microcontroller. A change in the alternating signal as well as failure of the time normal causes deactivation of the anti-lock control. When the pulses fall from the predetermined time window, the control will be disabled. The above state-of-the-art circuit arrangement is based on the use of two microcontrollers of redundant operation.

SUMMARY OF THE INVENTION

An object of the present invention is to provide a method of the type initially referred to which permits identifying a malfunction with a high degree of safety and reliability even when only one single program-controlled circuit in conjunction with a monitoring circuit is used so that an error signal can be generated which switches the system over to a condition which is safety-uncritical, or disables the control of a brake system.

It has been found that this object can be achieved by a process including data words which are produced in the program run of the circuit to be monitored and are transmitted to the monitoring circuit at predetermined times. Further, the content of the data words and the time of the appearance of the data words is compared with specifications, i.e., predetermined data words and predetermined times, by way of the monitoring circuit.

In a particularly preferred aspect of the present invention, the data words produced in the program run of the circuit to be monitored provide a predetermined sequence of words, i.e., a defined sequence of predetermined words, which is compared for correlation with a corresponding specification or a corresponding word sequence by way of the monitoring circuit. According to the present invention, a defined data word is produced in the program run instead of monitoring a simple "watchdog" signal, i.e., a pulse generated in the working cycle. The data word must correlate with a specification in terms of contents and time. The monitoring circuit checks not only the content of the data word produced in the program run, but also the time of the appearance of the data word. Thus, both the time behavior of the monitoring signal is checked and a more accurate judgment of the function of the microcontroller or the circuit to be monitored is permitted by analyzing the data word or the data word sequence.

The predetermined word sequences are appropriately produced according to different algorithms in the circuit to be monitored and in the monitoring circuit.

In another preferred aspect of the present invention, the monitoring circuit takes from a memory the data words with which the data words produced in the circuit to be monitored are compared.

A circuit arrangement for implementing the process of the present invention includes a program-controlled circuit and a monitoring circuit. A data word sequence which is produced in the program run by the circuit to be monitored according to a predetermined algorithm is transmitted in this circuit in the working cycle to the monitoring circuit. The monitoring circuit has a comparator which compares the transmitted data word sequence in terms of contents and timely appearance for correlation with a predetermined (for example, stored) data word sequence and causes an error identification signal and switch signal when a transmitted data word sequence differs from the predetermined sequence. A circuit arrangement of this type is appropriate, for example, for use in a brake system with electronic control wherein the circuit to be monitored is configured as a single-chip microcontroller which is used to analyze the input signals obtained by wheel sensors and to generate braking pressure control signals.

Further details of the present invention can be seen in the following description of an embodiment, making reference to the accompanying drawings.

BRIEF DESCRIPTION OF THE DRAWINGS

In the drawings,

FIG. 2 is a schematically simplified view of an embodiment of a circuit arrangement of the present invention.

DETAILED DESCRIPTION OF THE DRAWINGS

Figure 1:
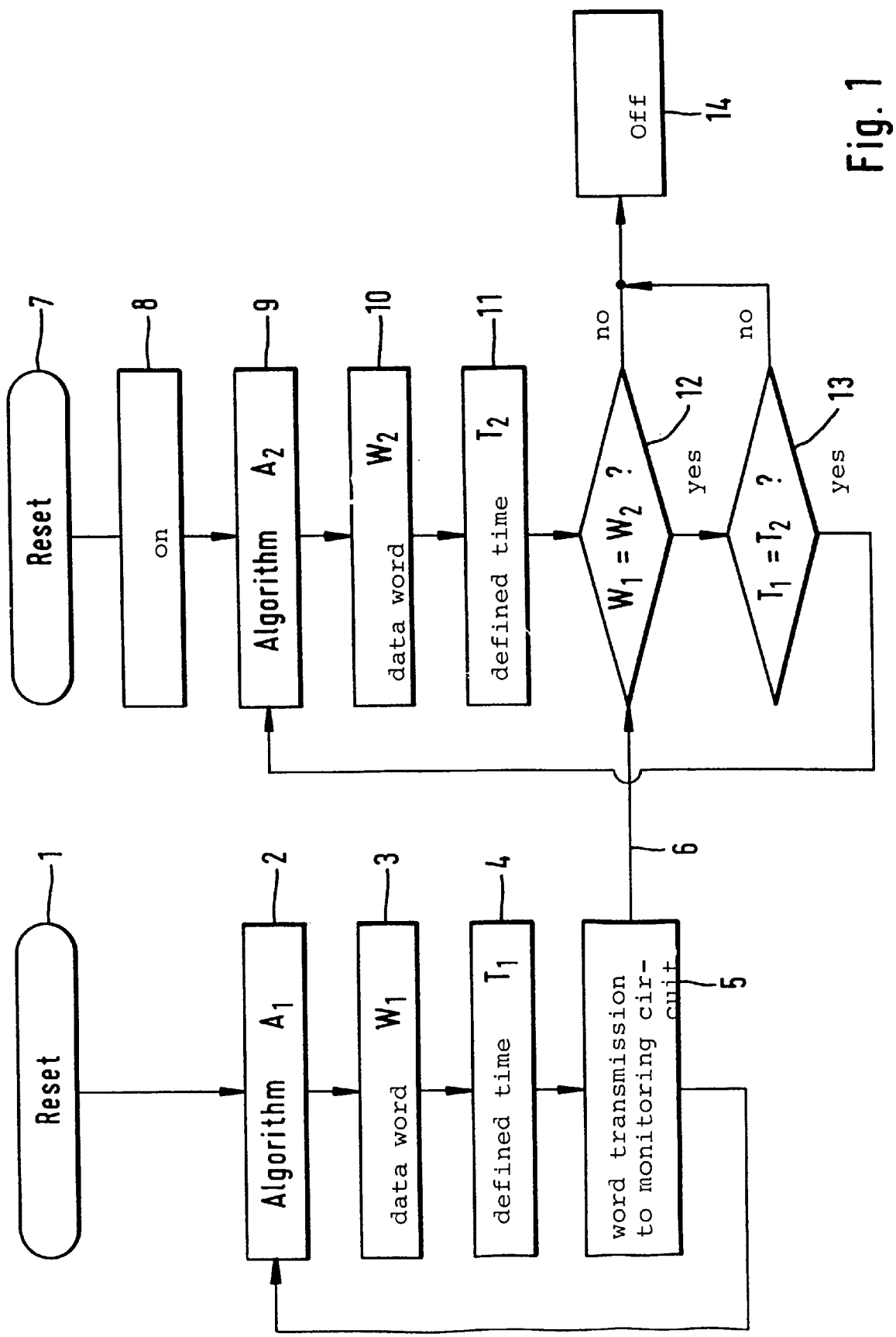
FIG. 1 is a flow chart illustrating the basic operation of the process of the present invention.

On the left hand side in FIG. 1, several operations 2 to 5 are shown in a flow chart or program sequence plan. Operations 2 to 5 are used to calculate a defined data word sequence which is required for the monitoring process of the present invention. Operations 2 to 5 indicate steps of a subprogram and are initiated by a start signal "reset" 1 of the program-controlled circuit to be monitored. Following a calculating operation 2 on the basis of an algorithm $A_1$, a word $W_1$ is produced in step 3 and submitted in step 4 after a defined time $T_1$. This action is followed in step 5 by a transmission of the word $W_1$ at the predetermined time to a monitoring circuit. The word transmission is represented by an arrow 6. The subprogram including steps 2 to 5 is now repeated because it is a closed loop.

The monitoring circuit is started by a reset 7. After activation (8), a calculating operation is performed in step 9 with the algorithm $A_2$, whereupon (at 10) a data word $W_2$ is produced which, after a defined time $T_2$ (at 11), is compared with the transmitted word $W_1$ in an operation 12. If there is correlation of the transmitted word $W_1$ with the word $W_2$ determined in the monitoring circuit, and if the time condition $T_1=T_2$ is also satisfied, the monitoring procedure is continued. If, however, differences are found in step 12 and/or step 13, the result is disabling of the control (represented by operation 14).

The start signals "reset" 1 and "reset" 2 are initiated by the same event, for example, by switching on the ignition of an automotive vehicle engine. With an appropriate algorithm, no further synchronization of the circuit to be monitored, which performs operations 1 to 5, with the monitoring circuit 7 to 14 is required.

In FIG. 2, the program-controlled circuit to be monitored (which is the microcontroller of an ABS system) is designated by reference numeral 15. The processor outputs $S_{out}$ (serial out), $S_{in}$ (serial in), SCK (clock) and CS (chip select) lead to a serial interface 16. A monitoring circuit which is comprised of the components shown on the right of the interface 16 is connected by way of the serial interface 16.

By way of an input switch or "buffer" 17, the individual data words are transmitted into a serial slide register 18 and further conducted in parallel to a comparator 20 by way of a multiple line 19. In comparator 20, the data word $W_1$ issued by the circuit 15 to be monitored and introduced by way of line 19 is compared for correlation with a data word $W_2$ which is taken from a table memory 21. The memory 21 is connected to the comparator 20 by way of a multiplexer 22 and a multiple signal line 23. Further, the monitoring circuit includes a counter or divider 24, two AND-gates 25, 26, an inverter 27, two flipflops 28, 29 and also an OR-gate with a negated output (NOR-gate) which leads to a safety relay (not shown). With a signal "1" at the output of the NOR-gate 30, a safety relay is switched on ("ON) because the circuit to be monitored and the test circuit function properly. A signal "0" at the output of NOR-gate 30 causes deactivation of the control.

The operation of the monitoring circuit of FIG. 2 is as follows:

The following situation prevails following a start signal "POR" (power reset) at the reset inputs of the circuit 15 to be monitored and the multiplexer 22 and the "POR" input of counter 24:

signal "1" (ON) at the output of gate 30, counter 24 is reset, multiplexer 22 is at "word 1" of the memory 21.

Initially, there is no data word $W_1$. Consequently, "0" prevails at the output of the comparator 20.

Flipflops 28 and 29 are also reset by the "POR" signal.

The working cycle of the circuit to be monitored and the monitoring circuit amounts to 10 msec in the following example:

Within the period from 0 to 9 msec which is predetermined by the divider 24, the signal "0" must remain at the output of the comparator 20 because the AND-gate 26 is released in this time and a signal 1 at the output of the comparator 20 would set the flipflop 28, with the result that the safety relay is disabled by the OR-gate 30.

The condition $W_1=W_2$ must now be satisfied within the period from 9 to 10 msec so that an output signal 1 is generated at the output of the comparator 20. The following steps take place:

The counter 24 is actuated by way of the OR-gate 25 and the "reset" input and reset to "0".

The multiplexer 22 takes a new data word from the memory 21.

The output of the comparator 20 becomes "0" again.

The flipflop 28 is released again by the AND-gate 26.

The cycle is repeated.

When the condition $W_1=W_2$ is not satisfied, so that the output signal of the comparator 20 maintains the value "0", the counter 24 will overflow. The result is that, after 10 msec, the flipflop 29 is set and the safety relay is switched to OFF by way of the OR-gate 30, which is represented by the output signal OFF in FIG. 2.

The monitoring circuit of FIG. 2 is a particularly simple embodiment. Of course, there are still other linking possibilities.

The data word sequence composed of determined data words can be formed in a very differing manner in the program-controlled circuit 15 which shall be monitored. It is appropriate, for example, to evaluate the result of the testing routines which take place in regular intervals in a program-controlled circuit of the type at issue in order to produce the data word sequences. It is also possible to call up determined words from a memory, which is associated with the circuit to be monitored, and to compare these words with the words in the memory 21 of the test circuit.

Thus, the present invention achieves monitoring a microprocessor, microcontroller or any other program-controlled circuit in a very simple manner. The output of a defined data word sequence does not require additional effort and equipment. The monitoring circuit described above may be realized by a small number of circuits, as shown in the example described.

We claim:

1. A process of monitoring the correct function of a program-controlled circuit, comprising:

during a working cycle of the program-controlled circuit, producing data words in the program run of the program-controlled circuit;

transmitting the data words to a monitoring circuit at predetermined times;

using the monitoring circuit to compare content and timing of the data words with predetermined data words and predetermined time intervals; and based on a result of comparing the content and timing of the data words with the predetermined data words and the predetermined time intervals, determining whether a malfunction has occurred wherein the data words produced in the program run of the program-controlled circuit provide sequence of words, which are compared for correlation with a corresponding predetermined sequence of words by the monitoring circuit.

2. The process as claimed in claim 1, wherein the sequences of words in the program-controlled circuit and in the monitoring circuit are produced according to different algorithms.

3. The process as claimed in claim 1, wherein the monitoring circuit retrieves the predetermined data words from a memory.

4. The process as claimed in claim 1, wherein the monitoring circuit compares time periods between two successive data words with predetermined periods for correlation.

5. The process as claimed in claim 1, wherein the program-controlled circuit and the monitoring circuit produce data words in response to a recurring event.

6. A process, according to claim 5, wherein the recurring event is activation of an ignition of an automotive engine.

* * * * *